US006956973B1

(12) United States Patent
Liang et al.

(10) Patent No.: US 6,956,973 B1
(45) Date of Patent: Oct. 18, 2005

(54) IMAGE COMPRESSION (75) Inventors: Jie Liang, Plano, TX (US); Antonio Ortega, Los Angeles, CA (US); Youngjun Yoo, Richardson, TX (US); Christos Chrysafis, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 762 days.

(21) Appl. No.: 09/164,517

(22) Filed: Sep. 30, 1998

Related U.S. Application Data (60) Provisional application No. 60/060,414, filed on Sep. 30, 1997.

(51) Int. Cl.[7] ............................................... G06K 9/36

(52) U.S. Cl. ...................... 382/240; 382/243

(58) Field of Search ............................... 382/247, 246, 382/240, 249, 239; 358/426; 375/240.02, 375/240.16, 240.19

(56) References Cited

U.S. PATENT DOCUMENTS

| 5,357,250 | A | * | 10/1994 | Healey et al. | ............... 341/107 |
| 5,442,458 | A | * | 8/1995 | Rabbani et al. | ............. 358/426 |
| 5,703,646 | A | * | 12/1997 | Oda | ....................... 375/240.13 |
| 5,748,786 | A | * | 5/1998 | Zandi et al. | ................. 382/240 |
| 5,818,877 | A | * | 10/1998 | Tsai et al. | ...................... 341/67 |
| 5,901,251 | A | * | 5/1999 | Rust | ............................ 382/247 |
| 5,966,465 | A | * | 10/1999 | Keith et al. | ................. 382/232 |
| 6,141,446 | A | * | 10/2000 | Bolick et al. | ............... 382/238 |

OTHER PUBLICATIONS

Chrysafis et al. "Efficient context-based entropy coding for lossy wavelet image compression" Proc. Data Compression Conference, Mar. 1997, pp. 241-250.*

* cited by examiner

*Primary Examiner*—Jingge Wu
(74) *Attorney, Agent, or Firm*—Carlton H. Hoel; W. James Brady; Frederick J. Telecky, Jr.

(57) ABSTRACT

A method of image encoding using subband decomposition followed by modified zerotree coding with a symbols for zero and significant zerotrees and isolated zeroes and isolated significant coefficients.

3 Claims, 6 Drawing Sheets

IMAGE COMPRESSION

CROSS-REFERENCE TO RELATED APPLICATIONS

The application claims the benefit of following copending provisional application disclose related subject matter: U.S. Ser. No. 60/060,414 filed Sep. 30, 1997.

BACKGROUND OF THE INVENTION

The invention relates to electronic image methods and devices, and, more particularly, to digital communication and storage systems with compressed images.

Video communication (television, teleconferencing, Internet, and so forth) typically transmits a stream of video frames (pictures, images) along with audio over a transmission channel for real time viewing and listening or storage. However, transmission channels frequently add corrupting noise and have limited bandwidth. Consequently, digital video transmission with compression enjoys widespread use. In particular, various standards for compression of digital video have emerged and include H.261, MPEG-1, and MPEG-2, with more to follow, including in development H.263 and MPEG4. There are similar audio compression methods.

Tekalp, Digital Video Processing (Prentice Hall 1995), Clarke, Digital Compression of Still Images and Video (Academic Press 1995), and Schafer et al, Digital Video Coding Standards and Their Role in Video Communications, 83 Proc. IEEE 907 (1995), include summaries of various compression methods, including descriptions of the H.261, MPEG-1, and MPEG-2 standards plus the H.263 recommendations and indications of the desired functionalities of MPEG-4. These references and all other references cited are hereby incorporated by reference.

H.261 compression uses interframe prediction to reduce temporal redundancy and discrete cosine transform (DCT) on a block level together with high spatial frequency cutoff to reduce spatial redundancy. H.261 is recommended for use with transmission rates in multiples of 64 Kbps (kilobits per second) to 2 Mbps (megabits per second).

The H.263 recommendation is analogous to H.261 but for bitrates of about 22 Kbps (twisted pair telephone wire compatible) and with motion estimation at half-pixel accuracy (which eliminates the need for loop filtering available in H.261) and overlapped motion compensation to obtain a denser motion field (set of motion vectors) at the expense of more computation and adaptive switching between motion compensation with 16 by 16 macroblock and 8 by 8 blocks.

MPEG-1 and MPEG-2 also use temporal prediction followed by two dimensional DCT transformation on a block level as H.261, but they make further use of various combinations of motion-compensated prediction, interpolation, and intraframe coding. MPEG-1 aims at video CDs and works well at rates about 1–1.5 Mbps for frames of about 360 pixels by 240 lines and 24–30 frames per second. MPEG-1 defines I, P. and B frames with I frames intraframe, P frames coded using motion-compensation prediction from previous I or P frames, and B frames using motion-compensated bi-directional prediction/interpolation from adjacent I and P frames.

MPEG-2 aims at digital television (720 pixels by 480 lines) and uses bitrates up to about 10 Mbps with MPEG-1 type motion compensation with I, P. and B frames plus added scalability (a lower bitrate may be extracted to transmit a lower resolution image).

However, the foregoing MPEG compression methods result in a number of unacceptable artifacts such as blockiness and unnatural object motion when operated at very-low-bit-rates. Because these techniques use only the statistical dependencies in the signal at a block level and do not consider the semantic content of the video stream, artifacts are introduced at the block boundaries under very-low-bit-rates (high quantization factors). Usually these block boundaries do not correspond to physical boundaries of the moving objects and hence visually annoying artifacts result. Unnatural motion arises when the limited bandwidth forces the frame rate to fall below that required for smooth motion.

MPEG-4 is to apply to transmission bitrates of 10 Kbps to 1 Mbps and is to use a content-based coding approach with functionalities such as scalability, content-based manipulations, robustness in error prone environments, multimedia data access tools, improved coding efficiency, ability to encode both graphics and video, and improved random access. A video coding scheme is considered content scalable if the number and/or quality of simultaneous objects coded can be varied. Object scalability refers to controlling the number of simultaneous objects coded and quality scalability refers to controlling the spatial and/or temporal resolutions of the coded objects. Scalability is an important feature for video coding methods operating across transmission channels of limited bandwidth and also channels where the bandwidth is dynamic. For example, a content-scalable video coder has the ability to optimize the performance in the face of limited bandwidth by encoding and transmitting only the important objects in the scene at a high quality. It can then choose to either drop the remaining objects or code them at a much lower quality. When the bandwidth of the channel increases, the coder can then transmit additional bits to improve the quality of the poorly coded objects or restore the missing objects.

For encoding a single frame as in JPEG or an I frame in MPEG, Shapiro, Embedded Image Coding Using Zerotrees of Wavelet Coefficients, 41 IEEE Tr.Sig.Proc 3445 (1993) provides a wavelet hierarchical subband decomposition which groups wavelet coefficients at different scales and predicts zero coefficients across scales. This provides a quantization and fully embedded bitstream in the sense that the bitstream of a lower bitrate is embedded in the bitstream of higher bitrates.

Villasenor et al, Wavelet Filter Evaluation for Image Compression, 4 IEEE Tr.Image Proc. 1053 (1995) discusses the wavelet subband decomposition with various mother waveless.

However, more efficient coding at low bitrates remains a problem.

Hardware and software implementations of the JPEG, H.261, MPEG-1, and MPEG-2 compression and decoding exist. Further, programmable microprocessors or digital signal processors, such as the Ultrasparc or TMS320C6x, running appropriate software can handle most compression and decoding, and less powerful processors may handle lower bitrate compression and decompression.

SUMMARY OF THE INVENTION

The present invention provides image compression for simple images with bitplane context modeling and for images containing both simple and natural image portions with a combination of bitplane context modeling plus predictive embedded zerotree coding using a tiling of the image to segment the portions.

This has the advantage of decreasing the bits required for coding with little compensation required in a decoder and can be used for JPEG or MPEG I frames or objects.

BRIEF DESCRIPTION OF THE DRAWINGS

The drawings are schematic for clarity.

DESCRIPTION OF THE PREFERRED EMBODIMENTS

Single Frame Modified Zerotree Preferred Embodiment

Figure 1:
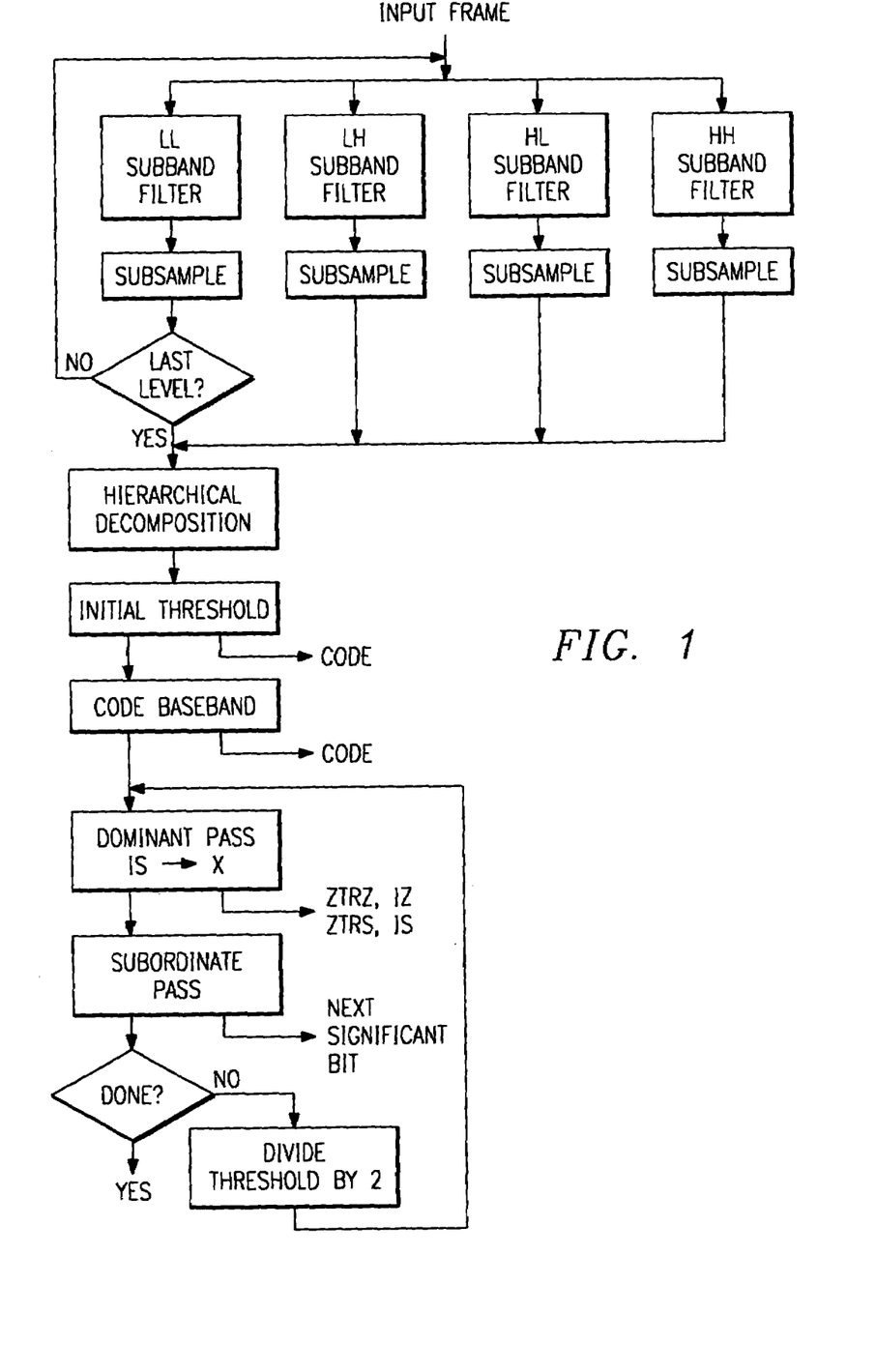
FIG. 1 is a flow diagram for a preferred embodiment encoding.

FIG. 1 is a flow diagram of a first preferred embodiment image or frame encoding using wavelet hierarchical decomposition. The flow diagram will be explained with the help of an example for simplicity; thus presume a frame of 144 rows of 176 pixels with 8-bit pixels (−128 to +127) and presume four scale levels in a wavelet hierarchical decomposition. The value of the pixel at (j,k) may be denoted x(j,k) for $0 \leq j \leq 143$ and $0 \leq k \leq 175$.

To begin the hierarchical decomposition, first filter the 144 by 176 frame with each of the four filters $h_0(j)h_0(k)$, $h_0(j)h_1(k)$, $h_1(j)h_0(k)$, and $h_1(j)h_1(k)$, to give 144 by 176 filtered frames (boundary pixel values are used to extend the frame for computations which otherwise would extend beyond the frame). A computationally simple $h_0(k)$ function equals $1/\sqrt{2}$ at k=0,1, and is zero for all other k; $h_1(k)$ equals $1/\sqrt{2}$ at k=0, $-1/\sqrt{2}$ at k=1, $1/8\sqrt{2}$ at k=2,3, $-1/8\sqrt{2}$ at k=−1,−2, and zero for all other k. The Villasenor article cited in the Background lists other filter functions. The filtering is mathematically convolution with the functions, so $h_0$ is a lowpass filter in one dimension (averages over two adjacent pixels) and $h_1$ is a highpass filter in one dimension (essentially a difference of adjacent pixels). Thus the four filters are two-dimensional lowpass-lowpass, lowpass-highpass, highpass-lowpass, and highpass-highpass, respectively.

Figure 2A:
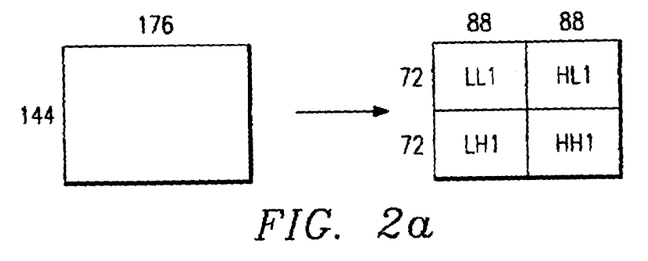
FIGS. 2a–c illustrates subband hierarchical decomposition.
Figure 2B:
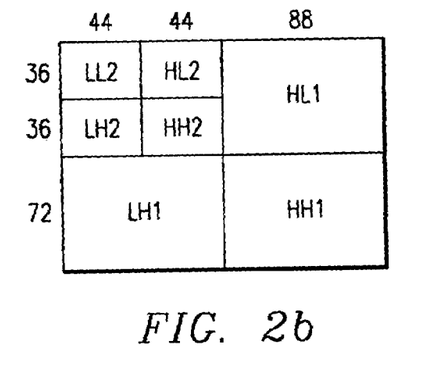

Next, subsample each filtered frame by a factor of four by retaining only pixels at (j,k) with j and k both even integers. This subsampling will yield four 72 by 88 subarrays of wavelet coefficients, denoted LL1, LH1, HL1, and HH1, respectively, with coefficient locations (j,k) relabelled for $0 \leq j \leq 71$ and $0 \leq k \leq 87$. This forms the first level of the decomposition, and the four subarrays can be placed together to form a single 144 by 176 array which makes visualization of the decomposition simple as illustrated in FIG. 2a. Thus LL1 is a lower resolution version of the original frame and could be used as a compressed version of the original frame. The values of the pixels in these filtered and subsampled images are the first level wavelet coefficients.

The LL1, LH1, HL1, and HH1 subarrays can be used to reconstruct the original frame by first interpolating each subarray by a factor of four (to restore the 144 by 176 size), then filtering the four 144 by 176 arrays with filters $g_0(j)g_0(k)$, $g_0(j)g_1(k)$, $g_1(j)g_0(k)$, and $g_1(j)g_1(k)$, respectively, and lastly pixelwise adding these four filtered images together. The functions $g_0$ and $g_1$ are lowpass and highpass filters, respectively, and relate to $h_0$ and $h_1$ by $g_0(n)=(-1)^n h_1(n)$ and $g_1(n)=(-1)^n h_0(n)$. The $h_0$, $h_1$, $g_0$, and $g_1$ functions are symmetric about ½, rather than about 0 as would be the case for an odd tap filter, so after reconstruction the pixel index is shifted by 1 to adjust for the two ½ pixel shifts during two filterings.

The second level in the decomposition simply repeats the four filterings with the $h_0$ and $h_1$ functions plus subsampling by a factor of four but using the LL1 subarray as the input. Thus the four filtered subarrays are each 36 by 44 and denoted LL2, LH2, HL2, and HH2. As before, the LL2, LH2, HL2, and HH2 can be arranged to visualize the decomposition of LL1 and also could be used for reconstruction of LL1 with the $g_0$ and $g_1$ based filters. The LH1, HL1, and HH1 subarrays of first level coefficients remain unfiltered.

Repeat this decomposition on LL2 by filtering with the four filters based on $h_0$ and $h_1$ followed by subsampling to obtain LL3, LH3, HL3, and HH3 which are 18 by 22 coefficient subarrays. Again, LL3, LH3, HL3, and HH3 can be arranged to visualize the decomposition of LL2.

Figure 2C:
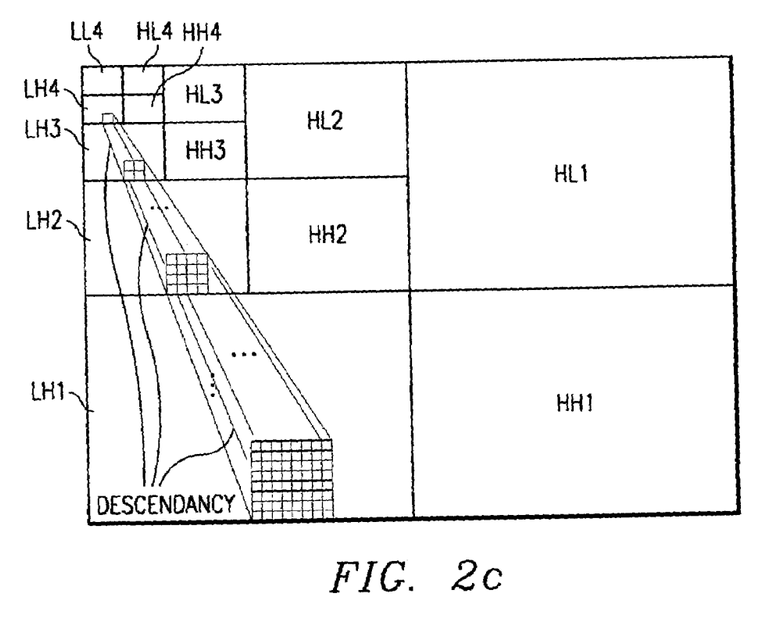

Complete the hierarchical four level decomposition of the original frame by a last filtering with the four filters based on $h_0$ and $h_1$ followed by subsampling of LL3 to obtain LL4, LH4, HL4, and HH4 which are each a 9 rows of 11 coefficients subarray. FIG. 2c illustrates all of the resulting subarrays arranged to form an overall 144 by 176 coefficient array. FIG. 2c also indicates the tree relation of coefficients in various levels of the decomposition; indeed, a coefficient w(j,k) in LH4 is the result of filtering and subsampling of coefficients x(j,k) in LL3:

w(j,k)=$h_0(0)h_1(0)x(2j,2k)+h_0(0)h_1(1)x(2j,2k-1)$
 $h_0(0)h_1(-1)x(2j,2k+1)+h_0(0)h_1(2)x(2j,2k-2)$
 $h_0(0)h_1(-2)x(2j,2k+2)+h_0(0)h_1(3)x(2j,2k-3)$
 $h_0(1)h_1(0)x(2j-1,2k)+h_0(1)h_1(1)x(2j-1,2k-1)$
 $h_0(1)h_1(-1)x(2j-1,2k+1)+h_0(1)h_1(2)x(2j-1,2k-2)$
 $h_0(1)h_1(-2)x(2j-1,2k+2)+h_0(1)h_1(3)x(2j-1,2k-3)$

Because the filtering plus subsampling is basically computing w(j,k) from the 2 by 2 area in LL3 (the values of hi(k) are small except for k=0,1), there are four coefficients (x(2j−1, 2k−1), x(2j−1,2k), x(2j,2k−1) and x(2j,2k)) in LL3 which determine w(j,k) in LH4. Now each of these four coefficients in LL3 is related to a corresponding one of the four coefficients in LH3 at the same positions ((2j−1, 2k−1), (2j−1,2k), (2j,2k−1) and (2j,2k)) because they were computed from essentially the same 4 by 4 location in LL2. Thus the coefficient w(j,k) in LH4 is called the parent of the four related coefficients z(2j−1,2k−1), z(2j−1,2k), z(2j,2k−1) and z(2j,2k) in LH3 and each of these four coefficients in LH3 is a child of the parent coefficient in LH4. This terminology extends to LH2 and LH1. The generic term descendant includes children, children of children, and so forth. See FIG. 2c showing descendants.

Using the hierarchical decomposition of the original frame into coefficient subarrays LL4, LH4, . . . , HH1, begin the modified embedded zerotree encoding: first find the maximum of the magnitudes of the coefficients w(j,k) in the coefficient array (union of subarrays LL4, LH4, HL4, . . . LH1, HL1, HH1) except exclude the coefficients in LL4 which will be separately encoded. Then pick an initial quantization threshold, $T_0$, so that $T_0 \leq \max|w(j,k)| < 2T_0$ The initial threshold value, $T_0$, is encoded (with a variable length code) and made part of the bitstream.

Embedded zerotree encoding essentially encodes w(j,k) by using a binary expansion of $w(j,k)/T_0$ with successive scans of the coefficient array adding successive bits in the expansion. This provides a fully embedded bitstream with resolution increasing over an entire reconstructed image on each scan of the array. For example, a background transmitted over the Internet could be improved with updates between data transmissions. Scan the wavelet coefficient array in the order of lowpass to highpass; that is, the subarrays are scanned in the order of LH4, HL4, . . . ,HL1, HH1 with each subarray raster scanned (a row at a time). Thus the decoder receiving a transmitted bitstream can determine wavelet coefficient location in the coefficient array by order in the bitstream.

First code the baseband LL4 with DPCM or PCM; LL4 has no descendant coefficients and simple zerotree coding does not have any gain over PCM. Indeed, PCM codes each of the 99 (9 by 11) coefficients individually, and successive bit planes (one bit from each of the 99 coefficients) provide successively better resolution. Thus PCM can be part of a fully embedded bitstream syntax. DPCM uses fewer bits because the coefficients are coded as differences from adjacent coefficients, but this disrupts full embedding. LL4 is basically a low resolution version of the original frame (each wavelet coefficient is essentially an average of the pixels in a 16 by 16 macroblock), thus putting a DPCM coded LL4 near the front of the bitstream is practical. FIG. 1 shows the case of DPCM coding LL4; for PCM with full embedding, the looping with threshold decrementing would include the code baseband block.

Figure 3A:
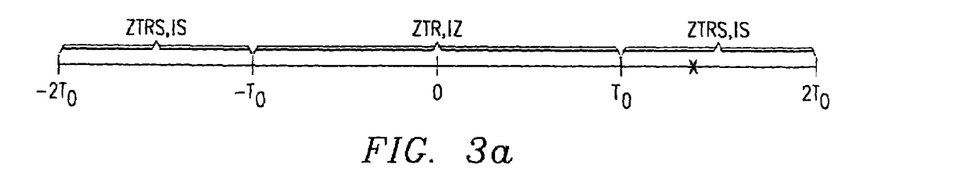
FIGS. 3a–d show coefficient encoding.

Next, raster scan subarray LH4 and encode each of the 99 wavelet coefficients to indicate which of the following four classes w(j,k) falls into: (i) ZTRZ (zerotree root with zero value) if $|w(j,k)|<T_0$ and all descendants of w(j,k) (4 in LH3, 16 in LH2, and 64 in LH1) also have magnitudes less than $T_0$, (ii) ZTRS (zerotree root with significant value) if $|w(j,k)| \geq T_0$ but all descendants of w(j,k) (4 in LH3, 16 in LH2, and 64 in LH1) have magnitudes less than $T_0$, (iii) IZ (isolated zero) if $|w(j,k)|<T_0$ but at least one of the descendant wavelet coefficients has magnitude not less than $T_0$, and (iv) IS (isolated significant coefficient) if $|w(j,k)| \geq T_0$ and at least one of the descendant wavelet coefficients has magnitude not less than $T_0$. The 99 coefficients in LH4 are raster scanned, and the encoding generates 198 bits if each coefficient takes two bits or, preferably, generates fewer bits if an adaptive arithmetic coding is used. Note that if a wavelet coefficient in LH4 is encoded as ZTRZ or ZTRS, then the decoder determines that all of the descendant wavelet coefficients have magnitude less than $T_0$ and so these coefficients need not be coded in this scan of the coefficient array because they are already known to be insignificant. FIG. 3a illustrates the range of coefficient values and codes associated with them. Also, start a list of significant coefficients and append w(j,k) to the list if w(j,k) is coded as IS plus replace it with symbol X in the LH4 subarray. On successive scans of the coefficient array additional bits from the binary expansion of these coefficients on the list of significant coefficient will be coded. The decoder reconstructs the coefficients from the successive bits by knowing the scan order and the array locations from the initial ZTRS and IS codes. Also, on successive scans the threshold is divided by powers of 2, so the wavelet coefficients initially encoded as ZTRZ or IZ may be further resolved as ZTRS or IS and appended to the list. Also, after coding symbols ZTRS or IS, one additional sign bit is also sent.

X evaluates as a 0 for threshold comparisons (i.e., as in checking to see whether a parent coefficient is a ZTRZ or ZTRS) but is skipped rather than coded as a 0 on successive scans. This use of symbol X rather than a 0 as the replacement for a removed significant coefficient implies fewer coefficients may be needed for coding on subsequent scans of the array. There is a tradeoff between (1) using the X symbol as the replacement for significant coefficients which codes fewer bits by skipping the X symbols on successive scans and (2) using a 0 as the replacement for significant coefficients which will save bits when the 0 is found to be a zerotree root.

Continue with the same coding (ZTRZ, ZTRS, IZ, or IS) for the raster scan of HL4 and then of HH4 along with the appending to the list of significant coefficient plus replacing by X of coefficients coded as ZTRS or IS.

After completing the fourth level coefficient subarrays, continue the scanning and encoding for the third level subarrays LH3, HL3, and HH3. In scans of these subarray a wavelet coefficient which has a parent coded as ZTRZ or ZTRS is just skipped; the decoder knows the locations of all descendants of a ZTRZ or ZTRS.

Figure 4A:
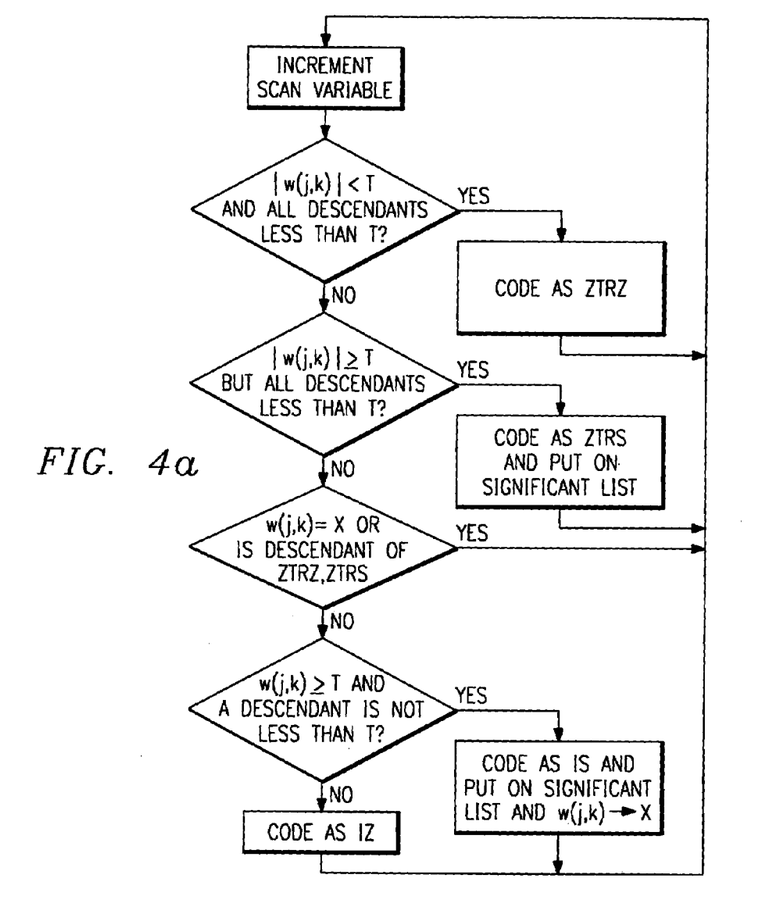
FIGS. 4a–b show flow for a dominant pass and the states.

Similarly, scan and encode the remaining subarrays in order LH2, HL2, HH2, LH1, HL1, and HH1 along with the appending to the significant coefficient list and replacement by symbol X for the coefficients coded as IS. FIG. 4a is a flow diagram of the entire array scan where the "increment scan variable" means raster scan of the subarrays in order. The array scan and coding is termed a dominant pass through the array.

The decoder may reconstruct a frame from the coefficient codes by using a values of $\pm 3T_0/2$ for coefficients coded ZTRS or IS and a value of 0 for coefficients coded ZTRZ or IZ. This encoding essentially is a map of the location (and sign) of significant coefficients (greater than threshold).

Figure 3B:
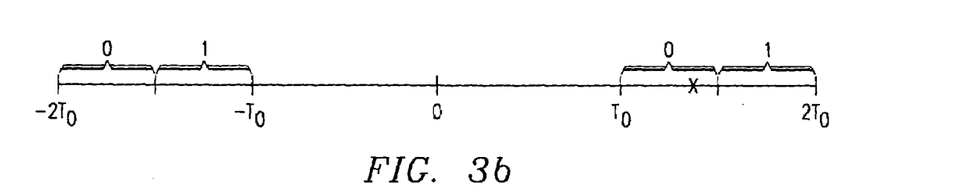

Next, encode the members of the list of significant coefficients in a subordinate pass in which each member has one more bit coded as follows: if w(j,k) was previously coded as significant and positive (which means $T_0 \leq w(j,k) < 2T_0$), then code a 0 for $T_0 \leq w(j,k) \leq 3T_0/2$ and a 1 for $3T_0/2 \leq w(j,k) < 2T_0$. Similarly for w(j,k) coded as significant and negative, code a 0 for $-2T_0 < w(j,k) \leq -3T_0/2$ and a 1 for $-3T_0/2 < w(j,k) \leq -T_0$. Note these are just the second most significant bits in the binary expansion of $w(j,k)/T_0$; ZTRS, IS, and a sign bit would be the sign and most significant bits (with negative numbers in two's complement format). FIG. 3b heuristically illustrates the range of codes.

Figure 3C:
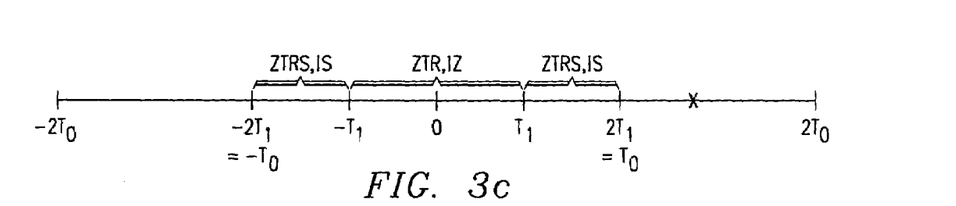
Figure 3D:
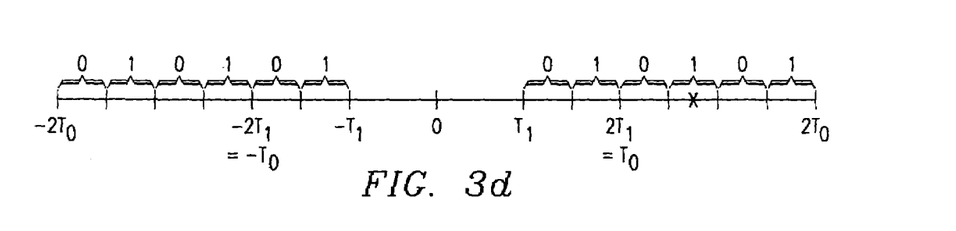
Figure 5A:
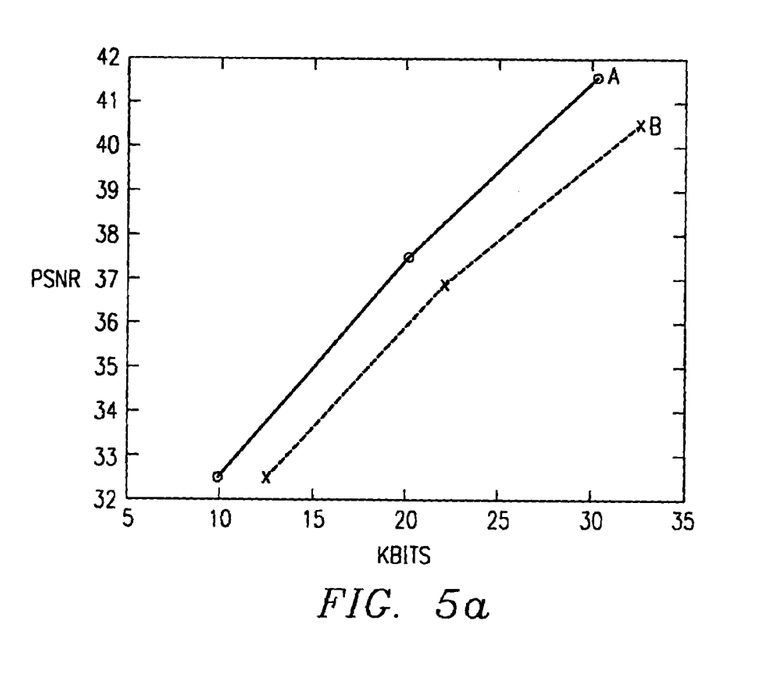
FIGS. 5a–c indicate empirical results.
Figure 5B:
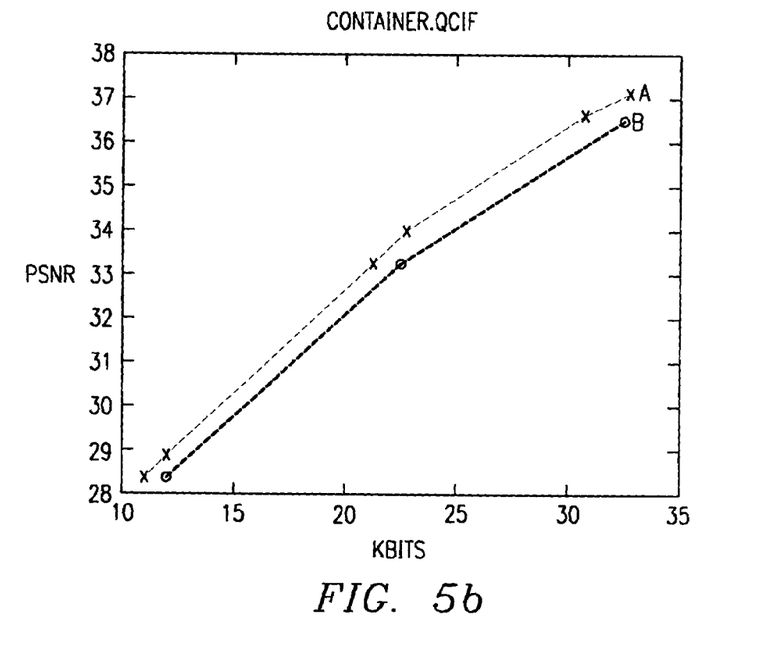
Figure 5C:
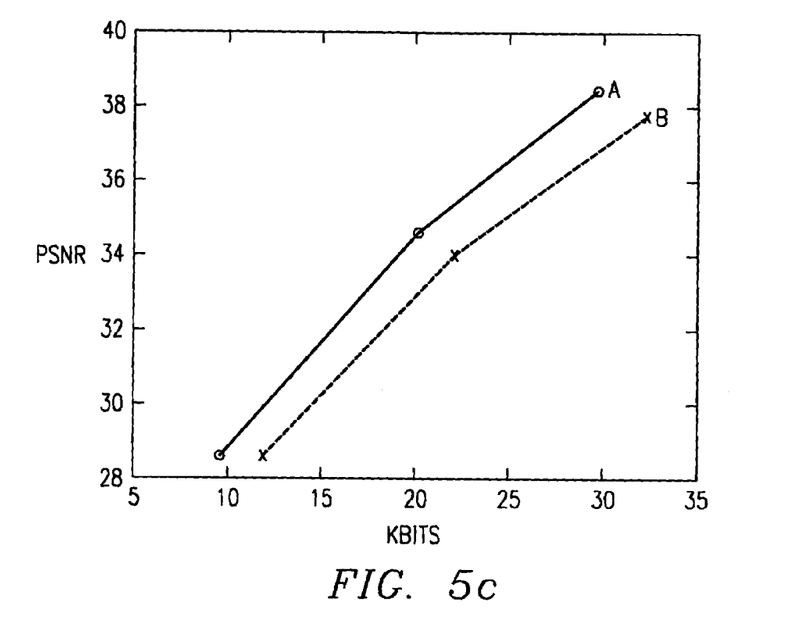

After completing the foregoing scan and ZTRZ-ZTRS-IZ-IS-skip coding (a dominant pass through the coefficient array) plus the additional bit for the members of the significant coefficient list (subordinate pass), replace $T_0$ by $T_1=T_0/2$ and repeat the dominant pass and subordinate pass with $T_1$ as the threshold. FIG. 3c illustrates the coefficient ranges for the dominant pass, and FIG. 3d illustrates the subordinate pass. The dominant pass typically appends more coefficients to the list of significant coefficients plus replaces them with Xs, and the subordinate pass adds an additional bit of resolution for each members of the list. During the dominant pass, the X value of a coefficient in the array is treated as a 0 for threshold comparisons but is skipped rather than being encoded a ZTRZ or IZ. On the average this use of X decreases the number of bits that need to be transmitted; see FIGS. 5a–c illustrating experimental results of the gain using X in connection with the preferred embodiment.

This successive decreases in the quantization threshold provides increasingly higher resolution reconstructions of the original frame. Further, if the initial threshold, $T_0$, may be selected for computational convenience provided in lies the range of half the coefficient maximum to the coefficient maximum.

In the original embedded zerotree algoriths of Shapiro, the wavelet coefficients are coded in several kpasses. Each pass encodes one bit plane. The positions of the coefficients that become significant with respect to the new threshold are encoded efficiently with zerotrees, in which each node of the tree represents the significance of the coefficient at the node and the coefficients in the substree rooted at the current node (one could consider a zerotree as essentially a significance map). The original embedded zerotree algorithm use the following symbols to represnt the significance of the nodes: ZTR, IZ, POS, NEG. ZTR represents a node where the coefficieent itself is zero and all its descendants are zero, IZ represents a node where the coeficient itself is zero and not all oof its descendants are zero, POS represents a node where the coeficient itself is positive, and NEG represnts a node where the coefficient itself is negative. It can be shown that statistically the sero wavelet coeficients tend to cluster in the same spatial location, and the conditional probability for zero coefficient is much higher given the parent of the coefficient being zero. This explains why the zerotree quantization reduces the overhead for the significance map and provides good coding efficiency.

The preferred embodiment improves coding efficiency with a different set of symbols: ZTRZ, ZTRS, IZ, IS. ZTRZ represents the node where the coefficient itself is zero as well as all of its descendants. ZTRS represents the node where the coefficient itself is nonzero, but all of its descendants are zero. IZ is a node where the coefficient is zero but not all of its descendants are zero; and IS represents a significant coefficient whose descendants are not all zero.

In comparison with the original symbols, the preferred embodiment replaces POS and NEG symbols with one symbol IS because the possibility for positive numbers and negative numbers are about equal. By using one symbol, this reduces the number of symbols used to reduce complexity and increase accuracy for probabilitgy estimation.

In addition, the preferred embodiment introduces the ZTRS symbol to make significant coeffficients permissible as the root of the zerotree. This addition can be justified with some theoretical analysis. For a given random signal generated by a autoregressive process, the frequency spectrum of the process is a decaying function with respect to frequency. The rate of decay must be faster than 1/f. Their wavelet coefficients also decay with respect to scale at a similar rate. It has been shown that even for the 1/f signals which exhibit infinite energy, wavelet coefficients also decay with respect to scales. Since in zerotree quantization, at each pass, the threshold divides in two, the possibility that a parent node is nonzero while all its descendant are zeros is significant. By introducing the symbol ZTRS, the preferred embodiment can efficiently represent all the zero descendants of a nonzero root node. Note that for the original embedded zerotree algorith, one needs to first send POS or NEG for the significant coefficient and then send four ZTR synmbols to indicate all descendants are zeros. Simulation results also confirm the improvement using the new symbol set.

Context Modeling and Forgetting Factors for Arithmetic Coding

Fixed point arithmetic coding is used to entropy code the zerotree symbols. Arithmetic coding is known to be able to optimally encode a stationay random sequnce if the statistics of the random signal can be estimated accurately. In practice, arithmetic coding can provide very good coding performance for small symbol sets, which is the case in the preferred embodiment.

The statistics are estimated with accumulative frequencies. Forgetting factors are used to adjust the adaptation window size of the frequency estimation. The forgetting factor allows the arithmetic codes to adjust to the local statistically. However, too small an adaptation window will fluctuate the statistics too frequently, which in turn degrades the performance. In the preferred embodiment, choose the forgetting factor to be 127, which empirically gives the best results.

Figure 4B:
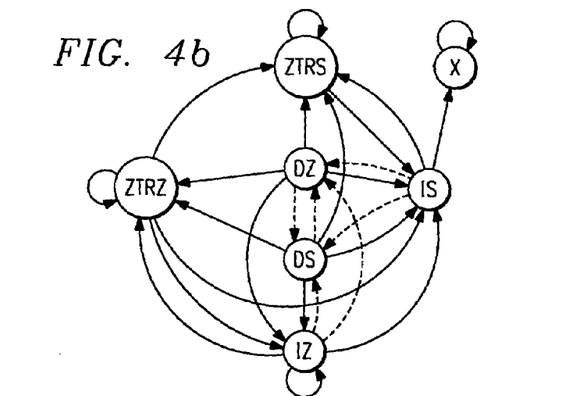

Most importantly, the perferred embbodiment uses context modeling to better estimate the probability distribution of the symbols. The context is determined by two factors:
(1) the state of the coefficient in the previous pass
(2) the subband that the coefficient is in Simulations show that the probability distribution of the current symbol is highly conditioned on the probability distribution of its state in the previous pass. For instance, if a coefficient is a descendant of a zero zerotree root (ZTRZ) in the previous pass, then its probability of being zero in the current pass is significantly higher than in the case where it is the descendant of a significant zerotree root (ZTRS). FIG. 4$b$ illustrates the state transition graph for a coefficient from a previous pass to the current pass. The additional symbols DZ, DS are for internal use only, where DZ refers to a descendant of a ZTRZ symbol, DS refers to the descendant of a ZTRS symbol.

The probability distributions for the various subbands are also quite different. For instance, for the highest subband, there will be no zerotree roots. When initializing the frequency count for the highest subband, set the frequency count for ZTRZ, ZTRS to be zero, because they will not appear in that subband.

For the subordinate pass, the probability for 1 or 0 is about equal. Therefore, no entropy coding could be used for the subordinate pass. In the preferred embodiment, use arithmetic coding to gain a bit more efficiency. The frequency count is initialized to be freq_sub=[1,1] which represent frequncy count for 1 and 0, respectively.

Lossless Zerotree

By using integer wavelet transforms (integer filter coefficients) such as the S-Transform, TS-Transform, and S+P Transform instead of the foregoing floating point wavelet transform, the foregoing preferred embodiment modified zerotree encoding can be extended to lossless coding. The bitstream is continuously scalable from very low bitrates to lossless coding. The following table shows the lossless compression performance for the USC image data set using the S+P Transform.

| Image | compression (bit/pixel) |
| --- | --- |
| Lena | 4.23 |
| couple | 4.83 |
| crowd | 4.08 |
| lax | 5.86 |
| man | 4.59 |
| woman1 | 4.73 |
| woman2 | 3.30 |
| average | 4.52 |

Coding Simple Images

Wavelet transform coding methods prevode excellent performance for lossy compression of natural images over all compression rates. Howver, wavelet-based methods fall short when the histogram of the images, or their subimages, has only small numbers of active intensity levels. For example, many intensity levels are never used within the image/subimage. Call such images "simple" images. Examples, of simple images of interest include bilevel images; gray-scale, or color, scanned bilevel images; computer genreated graphics with simple textures, et cetera.

Because wavelet transform is not very effective in compression of simple images, an image domain compression method can be employed as an alternative to achieve good compression. A similar approach can be found in some version of the CREW algorithm of Zandi et al, where bitplane coding with the JBIG algorithm is used, given appropriate criteria to determine simple image/subimages. With this option CREW achieved significant gains in cmpression performance for simple images, and for compound images continaing simple subimages.

The CREW algorithm was proposed in the context of lossless or near lossless compression; however, even in a lossy comporession environment these types of approaches are useful. In particuarl, when compound documents are considered efficient performance can be achieved even with lossless or near lossless compression of the image regions.

The preferred embodiment simple image compression method proceeds as follows. Presume a segmentation procedure has been used to divide an input image into simple and natural image regions. The compression method for the simple regions processes each bitplane successively, from most significant to least significant bits; this achieves an embedded bitstream. A binary arithmetic coder (e.g., U.S. Pat. No. 4,122,440) is used to to compress each bitplane. The conditional probability model of the arithmetic coder is instrumental for good compression performance, and it is described in the following.

Given an input bit to the binary arithmetic coder in the current bitplane, the context model is composed of two sets of bits: one from neighboring bits in the same bitplane-say $C_{intra}$ and the other from the bits in the other bitplanes-say $C_{inter}$. In order to not increase overhead to estimate the conditional probability of the current symbol, use a causal context, i.e., bits from the causal past, which have already been processed by the arithmetic coder and thus known to the encoder and the decoder.

The reason to consider two different sets of context bits in clear: first, the strong spatial correlation among image pixels also extends to some extent to its bitplanes and thus using $C_{intra}$ will be beneficial. Second, $C_{inter}$ is useful because because the images as simple images. Consider as an example a bilevel image scanned as an 8 bit image. In this case the two most llikely livels are going to be 0000 0000 and 1111 1111 and possibly levels which differ only in some of the least significant bits. Thus if a partiucarl pixel's MSB is 1, with high likelihood the remaining bits will also be 1. This motivates the fact that for simple images gain can be achieved by using information about the previously scanned bitplanes. This justifies the potential benefits of $C_{inter}$. Note that a similar intuition applies in the case where the original document scanned to 8 bit images are not bilevel. Because in those simple images the number of grayscale levels is much less than the maximum 256, for each given pattern of, say, 4 most significant bits, the number of possible combinations of the 4 least signficant bits is likely to be less than 16 and may indeed be biased to one particular level. This can be exploited through context mdeling. Note that gains can also be achieved for simple images by performing histogram compaction (e.g., if 32 levels are used in an 8 bit image, mapping first those 32 levels into 5 bits code, and then doing bitplane for each of those 5 bitplanes).

Once the context model has been selected, the compression method processes each bitplane in the usual raster scan order. Thie only necessary side information is the dimension of the input image, and the classification map which describes the location of simple and natural regions.

The preferred embodiment uses 4 bits in $C_{intra}$ the bits adjacent to the current one in the W, N, NW, and NE directions. When complessing the k-th bitplane (K=0, . . . 7), use k bits from the 0-th to (k−1)-th bitplanes in $C_{inter}$, where bitplane 0 corresponds to the MSB and bitplane 7 to the LSB. This can be regarded as a very simple context model, which could be extended by adding more bits from the causal neighborhood in $C_{intra}$.

This method can be compared to JBIG compression independently applied bitplane by bitplane. Experimental results indicate that the preferred embodiment outperforms the JBIG scheme for simpler images.

The test images are obtained by preprocessing their corresponding JPEG 2000 test images. The preprocessing used is needed to replace 64×64 tiles in the original image with a black tile (or all zero tile) if the tile histogram contains more than the prespecified number of levels. For instance, cmpnd1.idp is obtainedwith a threshold of 16 while the other two images with 64. The results:

| image | original size | pref.emb. | JBIG |
| --- | --- | --- | --- |
| cmpnd1.idp | 393216 | 3370 | 16056 |
| us.idp | 262144 | 21150 | 24011 |
| target.idp | 229376 | 11468 | 9739 |

Histogram compression can be used to preprocess simple images to help the performance of the preferred embodiment method. If the number of used intensity levels is small, then allow the side information to specify what intensity levels are in use and represent each pixel intensity with a reduced number of bits.

For example, if only 29 levels are used in a given image, represent the image using only 5 bits per pixel after specifying those 29 levels explicitly. This makes the preferred embodiment method avoid compressing 3 bitplanes so as to increase compression efficiency. However, when to use histogram compaction must be decided carefully, taking into account the tradeoff between bits added by overhead and saved by removal of redundant bitplanes.

Experiments indicate that histogram compaction can help compression of some simple images. First, preprocess us.raw (512×448 pixels) with a threshold of 24 to obtain us.idp (this contains only the simple regions in the original image). When compressing this image without preceding histogram compaction, yielded a file of 9161 bytes. When combined with histogram compaction, only 6 bitplanes are necessary (or 42 intensity levels are used for the whole Image) and the compressed file size is as small as 8373 bytes.

It has to be noted that the preferred embodiment provides much of the gain achievable from histogram compaction without some of its drawbacks. Specifically, there is no need to send overhead bits and the method adapts automatically to the occurrence of different histograms in different regions of the image.

While better results can be expected by using JPEG LS or CALIC for the same images, the preferred embodiment is very simple and offers embedded bitstream and bit scalability. Thus provided there is a reasonable way to segment a compound image (e.g., cmpnd1.raw), this lossless compression method can be incorporated with an embedded wavelet coder for compound images, i.e., apply this method to the simpler area (e.g., text regions of cmpnd1.raw) and wavelet coder to the natural image area (e.g., photo region of cmpnd1.raw).

The remaining issue is to determine effective ways of separating simple and natural image regions. This task is left to the encoder and appropriate overhead is sent to the decoder to indicate the classification. In our current version we use blocks of size 64×64 but constraint the natural regions to be rectangular. This scheme can be improved if arbitrary region shapes are possible. One such extension is to allow a tile by tile classification of the input and to perform filtering in each tile (with symmetric extensions at the edges). In this way the loss in performance for the natural image regions will be minimal. In addition, given that both bitstreams use bitplane encoding the overhead at the decoder is minimal. Essentially the decoder uses a context adaptive arithmetic coder for both regions and the main differences are:

No filtering is used for the simple image regions.

The context are different for each region type.

For simple regions low spatial resolution (smaller) images have less value than for natural images (for example, the textual information quickly becomes illegible after down-sampling). However the encoder has the option of providing different types of scalability if so desired. In one scenario, the encoder can send the natural image tiles in the order specified above, i.e., low frequency subbands are sent before the high frequency ones, while the simple image regions are simply sent in order of scan, one line at a time. Alternatively a low resolution representation of the simple image tiles can be embedded into the zero-tree structure. For example, assume that a tie of 64×64 pixels is classified as being simple. From this one can extract 3 32×32 tiles which can be embedded within the higher frequency subbands (but transmitted using a different probability and context model). This allows complete interleaving of the simple and natural image bitstreams. The remaining 32×32 pixels can be further split, so as to be embedded within the lower frequency bands. Note that several methods are available to generate the hierarchical data structure of tiles derived from the original simple tile in the input image. For example, one could use simple downsampling to generate the lower spatial resolution tiles. Alternatigely, a pyramidal structure could be built. In either case, the same bitplane by bitplane transmission method is preserved so that most singificant bits are sent prior to the least significant ibts, with the former being sued as context for the latter.

Experimental Results

FIGS. 5a–c illustrates the improvement in PSNR at various transmission bitrates from using the preferred embodiment predictive zerotree (using new symbols) over the standard zerotree with the baseband separately DPCM encoded and with the following 9-3 tap Daubechies filter functions for the hierarchical decomposition:

$h_0$[0.03314563036812, −0.06629126073624, −0.17677669529665, 0.41984465132952, 0.99436891104360, 0.41984465132952, −0.17677669529665, −0.06629126073624, 0.03314563036812]

$h_1$=[0.35355339059327, 0.70710678118655, 0.35355339059327]

The overall bitstream thus has an initial block of bits fully encoding LL4, then a block of bits encoding significant coefficient location using initial quantization thresholds, then a block of bits adding one bit accuracy to each of the significant pixels, then a block of bits encoding newly-significant coefficient location using refined quantization thresholds, then a block of bits adding one bit accuracy to each of the significant coefficients (both with initial quantization thresholds and refined thresholds), and so forth until target quantization refinement or other bitstream size or bitrate constraint occurs.

Figure 6:
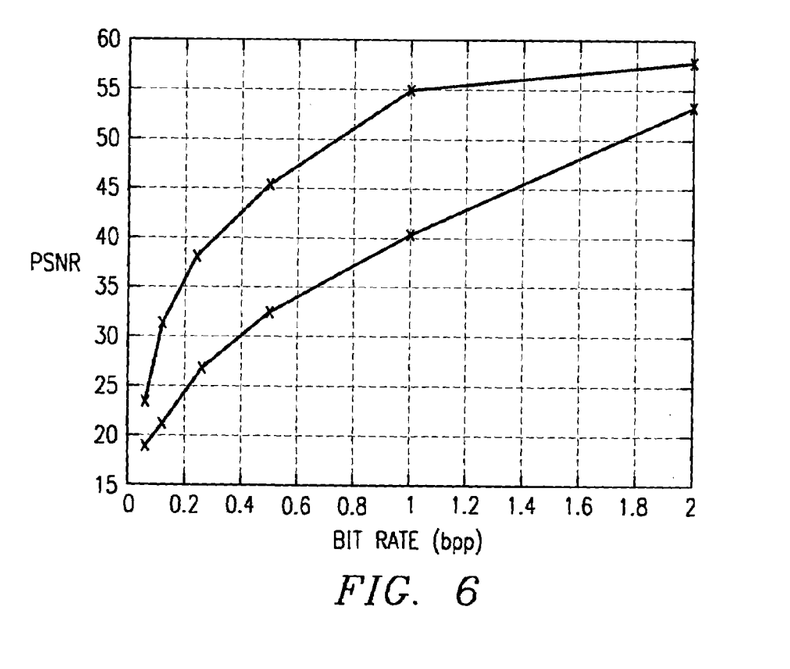
FIG. 6 illustrates the combination preferred embodiment.

FIG. 6 compares the results using a single method versus using two different methods, one for the simple image portions and one another for the natural image portions. In these results reflect the straightforward approach of sending separately (i.e., without interleaving) the simple and natural tiles.

Note that lossless compression is achieved at 2.62 bits per pixel when using modified zerotree and at 1.29 bit per pixel when using the combination of simple and natural, over a 40% gain.

Modifications

The preferred embodiments may be varied in many ways while retaining one or more of their features of zerotree coding with a wildcard symbol used for replacement of significant coefficients.

For example, the filters used for loss and lossless modes of operation could be different; the size of the images or frames, the number of decomposition levels, the initial thresholds, quantization levels, symbols, and so forth can be changed. Generally, subband filtering of other types such as QMF and Johnston could be used in place of the wavelet filtering provided that the region-of-interest based approach is maintained. Images (data structures) with one or four or more dimensions can analogously be encoded by subband decomposition and modified zerotree coding applied.

What is claimed is:

1. A method of encoding an image, comprising the steps of:
    (a) partitioning an image into simple and natural image portions;
    (b) transforming said natural image portion into wavelet coefficients;
    (c) decomposing said simple image portion into bitplanes and said wavelet coefficients into bitplanes; and
    (d) arithmetic encoding the bitplanes with a context model from the neighboring bits in a bitplane and previous bits at the location in previous bitplanes.

2. The method of claim 1, wherein:
    (a) said image is an I frame in a video sequence of frames including I and P frames in which P frames use motion compensation.

3. The method of claim 2, wherein:
    (a) said video sequence also includes B frames which use bidirectional motion compensation.

* * * * *